United States Patent [19]

Grealy et al.

[11] 4,424,151

[45] Jan. 3, 1984

[54] HEAT GELLABLE PROTEIN ISOLATE

[75] Inventors: Jennifer M. Grealy, Gores Landing; Terrence J. Maurice, Colborne; Chester D. Myers, Ajax, all of Canada

[73] Assignee: General Foods Inc., Don Mills, Canada

[21] Appl. No.: 348,875

[22] Filed: Feb. 16, 1982

[51] Int. Cl.³ .............................. A23J 1/12; A23J 1/14
[52] U.S. Cl. .............................. 260/123.5; 260/112 R; 426/656
[58] Field of Search ......................... 260/123.5, 112 R

[56] References Cited

U.S. PATENT DOCUMENTS

| | | | |
|---|---|---|---|
| 3,361,574 | 11/1968 | Paulsen | 260/123.5 X |
| 3,794,735 | 12/1974 | Newsom et al. | 260/123.5 X |
| 3,809,767 | 5/1974 | Sair et al. | 260/123.5 |
| 3,870,801 | 3/1975 | Tombs | 260/112 R X |
| 4,091,120 | 5/1978 | Goodnight, Jr. et al. | 260/123.5 X |
| 4,131,607 | 12/1978 | Petit et al. | 260/123.5 |
| 4,169,090 | 9/1979 | Murray et al. | 260/123.5 |
| 4,172,828 | 10/1979 | Davidson et al. | 260/123.5 |
| 4,208,323 | 6/1980 | Murray et al. | 260/123.5 |
| 4,234,620 | 11/1980 | Howard et al. | 260/123.5 X |
| 4,247,573 | 1/1981 | Murray et al. | 260/123.5 X |
| 4,285,862 | 8/1981 | Murray et al. | 260/123.5 |
| 4,307,014 | 12/1981 | Millar | 260/123.5 |

*Primary Examiner*—Howard E. Schain
*Attorney, Agent, or Firm*—Sim & McBurney

[57] ABSTRACT

Heat-gellable protein isolates are described which are capable of forming heat set gels of hardness values comparable to or exceeding that of egg white at the same dispersion concentration. The isolate is formed by manipulating the pH and ionic strength conditions of aqueous dispersion of a substantially undenatured vegetable protein isolate to provide an ionic strength greater than 0.2 and a pH up to about 6.0.

21 Claims, 3 Drawing Figures

HEAT GELLABLE PROTEIN ISOLATE

REFERENCE TO RELATED APPLICATION

This application is a continuation-in-part of copending U.S. patent application Ser. No. 183,465 filed Sept. 2, 1980 (now abandoned).

FIELD OF INVENTION

The present invention relates to novel heat gellable protein isolates which are suitable for use as substitutes or extenders for egg white.

BACKGROUND TO THE INVENTION

Egg white has certain functional properties which enable the material to be usefully used in various food compositions. One of those properties is the ability of aqueous dispersion thereof to heat set to a gel. Such gels are quite hard, typically having hardness values when formed from 20% w/w dispersion thereof of about 35 to 40 texturometer units (T.U.), as determined by the G. F. Texturometer. The G. F. Texturometer and its operation are described in detail in an article entitled "The Texturometer—A New Instrument for Objective Texture Measurement" by H. H. Friedman et al published in J. of Food Science, Vol. 28, p. 390 (1963).

Attempts have been made to provide vegetable proteins which are capable of being heat set to gels of hardness value similar to or exceeding that of egg white, but to date, as far as the applicants are aware, none has been successful. Conventional isoelectrically-produced soy isolates form much softer gels than egg white, such gels having hardness values of below about 20 T. U. when produced from 20% w/w dispersions thereof.

Among the isolates which are commercially available and produce gel hardness values such as recited above is the soy protein isolate known as "Promine D", sold by Central Soy. More recently a new isolate has become available in experimental quantities from A. E. Staley Manufacturing Company under the designation "U4-102". It is understood by the applicants herein that this isolate is produced by the procedure described in Howard et al U.S. Pat. No. 4,234,620.

A large body of other patent literature exists describing the formation of isolates and concentrates from soybeans and other vegetable protein sources. The terms protein "isolate" and protein "concentrate" are used in this specification in their conventional senses. An "isolate" is normally defined as a protein product containing at least about 90% by weight of protein (as determined by Kjeldahl nitrogen $\times 6.25$) while a "concentrate" is a protein product containing less protein.

Representative prior art patents include U.S. Pat. Nos. 4,169,090, 4,208,823, 4,296,026, 4,307,014, 3,361,574, 3,794,735, 3,809,767, 4,091,120, 4,131,607, and 4,172,828. The first four mentioned patents, namely U.S. Pat. Nos. 4,169,090, 4,208,823, 4,296,026 and 4,307,014 are assigned to the assignee of this application and are discussed in more detail below.

None of these prior art references give numerical data with respect to gel hardness values obtained in comparison with egg white at the same solids concentration. U.S. Pat. No. 4,172,828 (Davidson et al) indicates that a certain fraction obtained from soybeans can be used as an egg white substitute. It has been determined by the applicants that this fraction is a protein concentrate (rather than an isolate) and produces gels which are much less hard than egg white at the same concentration of protein in the gel.

There exists a need, therefore, for the provision of an egg white substitute or extender which is capable of producing gels from protein dispersions of hardness comparable to or exceeding gels produced from egg white dispersions at the same concentration of protein in the dispersion.

SUMMARY OF THE INVENTION

It has now surprisingly been found that dispersions of vegetable proteins which are heat gellable to gels of hardness values comparable to or exceeding gels produced from egg white dispersions at the same dispersion concentration can be provided by controlled manipulation of the pH and ionic strength values of an aqueous dispersion of a substantially undenatured protein isolate.

As noted above, gels which are produced from approximately 20% w/w egg white dispersions have hardness values in the range of 35 to 40 T.U. Gels produced from dispersions which are manipulated in accordance with the present invention at the same dispersion concentration, namely 20% w/w, have a hardness value of at least about 35 T.U. and preferably at least about 40 T.U.

Accordingly, the present invention provides a novel vegetable protein isolate containing at least about 90% by weight of vegetable protein (as determined by Kjeldahl nitrogen $\times 6.25$) and capable of forming heat set gels from dispersions thereof, which gels have a hardness value which is at least that of a heat set gel formed from a dispersion of egg white in water having the same dispersion concentration.

The present invention also provides a method of improving the heat gelation properties of a substantially undenatured vegetable protein isolate containing at least about 90% by weight of vegetable protein (as determined by Kjeldahl nitrogen $\times 6.25$), which comprises (a) treating at least one vegetable protein source material to form the vegetable protein isolate, and (b) subsequently treating the vegetable protein isolate both with at least one food grade salt and at least one food grade acidifying agent. The latter treatment incorporates in a heat gellable dispersion of the isolate sufficient food grade salt to provide an ionic strength of the dispersion of at least about 0.2 molar and sufficient food grade acidifying agent to provide a pH value of the dispersion of up to about 6.0.

The present invention further provides an aqueous protein dispersion suitable for heat gelation to a gel, which comprises a substantially undenatured vegetable protein isolate containing at least about 90% by weight of vegetable protein (as determined by Kjeldahl nitrogen $\times 6.25$) in the form of an amorphous protein mass which is formed by settling an aqueous dispersion of protein micelles consisting of homogeneous amphiphilic protein moieties and formed from at least one vegetable protein source material, the resulting protein mass having substantially no lipid content, substantially no lysinoalanine content and substantially the same lysine content as the storage protein in the source material, the isolate being dispersed in an aqueous phase having an ionic strength of about 0.3 to about 0.75 molar and a pH of about 4.5 to about 5.5.

GENERAL DESCRIPTION OF INVENTION AND DESCRIPTION OF PREFERRED EMBODIMENTS

Figure 1:
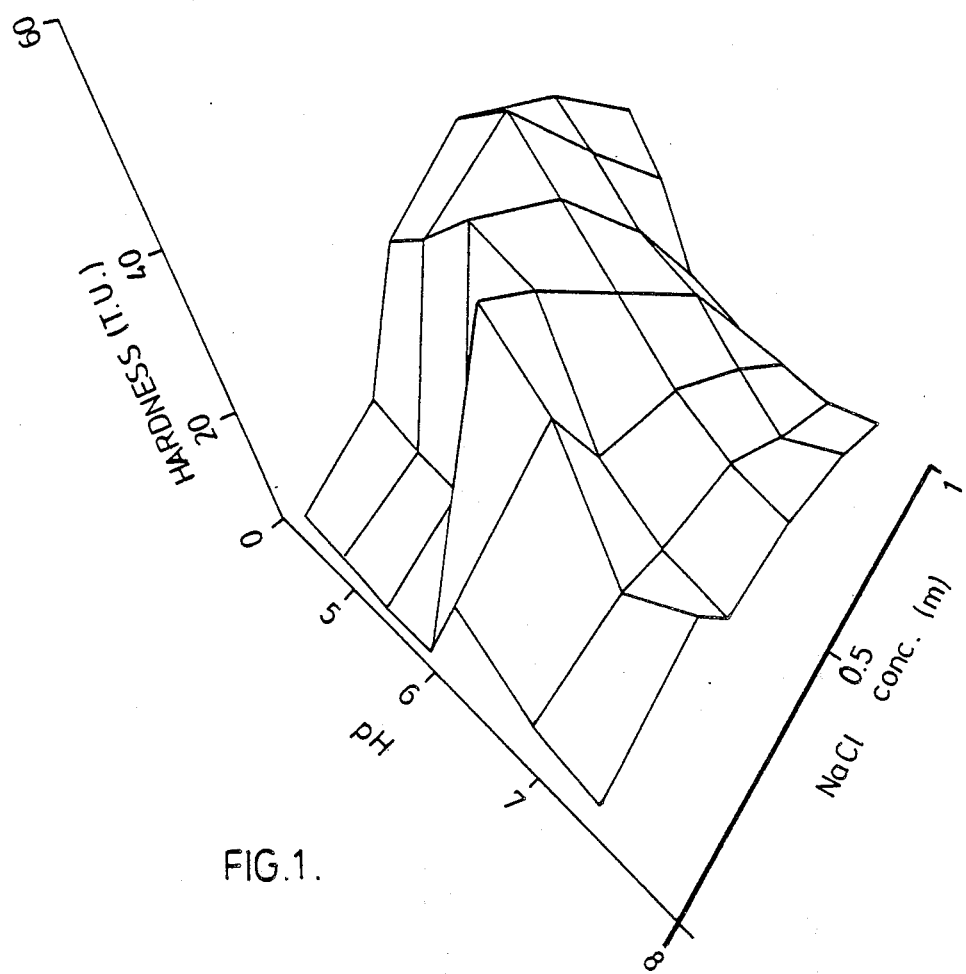
FIG. 1 is a graphical representation of the effects of pH and sodium chloride concentration on the hardness of gels produced from a substantially undenatured soy protein isolate.

The present invention is based on the combined effect of the manipulation of pH and ionic strength conditions of a vegetable protein isolate which is substantially undenatured, as determined by differential scanning calorimetry.

In U.S. Pat. Nos. 4,169,090 4,208,323, 4,296,026 and 4,307,014 assigned to the assignee of this application, the disclosures of which are incorporated herein by reference, there are described procedures for isolating protein from protein source materials by solubilizing the protein by contact of the protein source material with sodium chloride solution under critical pH and ionic strength conditions and diluting the protein solution with water to a lower ionic strength to cause the formation of protein micelles in the aqueous phase which settle and are collected as an amorphous protein micellar mass (sometimes abbreviated herein as "PMM"). The protein solution may be subjected to ultrafiltration prior to the dilution step and the settling may be enhanced by centrifugation.

The protein micellar mass produced by this procedure is a novel protein isolate and represents the vegetable protein isolate from which the heat gellable dispersions are formed. The novel protein isolate is described in detail in U.S. Pat. No. 4,285,862, assigned to the assignee of this application, the disclosure of which is incorporated herein by reference.

As described in more detail therein, the novel protein isolate is a substantially undenatured protein isolate product containing at least about 90% by weight of vegetable protein, (as determined by Kjeldahl nitrogen×6.25) and in the form of a protein micellar mass which is formed by settling an aqueous dispersion of protein micelles consisting of homogeneous amphiphilic protein moieties and formed from at least one vegetable protein source material, thereby collecting an amorphous protein mass. This amorphous protein mass is sometimes referred to herein as "PMM". The protein isolate product has substantially no lipid content, substantially no lysinoalanine content and substantially the same lysine content as the storage protein in the source material. The isolate product may be provided in dry form by drying the amorphous protein mass.

The aqueous dispersion of protein micelles from which the isolate is settled may be formed, in accordance with the procedure of U.S. Pat. No. 4,169,090, by solubilizing the protein in the vegetable protein source material at a temperature of about 15° to 35° C. using a food grade salt solution having a concentration of at least 0.2 molar ionic strength and a pH of 5.5 to 6.3 to form a protein solution, and diluting the protein solution to an ionic strength of less than 0.1 molar to cause formation of the dispersion.

The aqueous dispersion of protein micelles also may be formed, in accordance with the procedure of U.S. Pat. No. 4,208,323, by solubilizing the protein in the vegetable protein surce material at a temperature of about 15° to about 35° C. using a food grade salt solution having a concentration of at least 0.2 molar ionic strength and a pH of about 5 to about 6.8 to form a protein solution, increasing the protein concentration of the protein solution while maintaining the ionic strength thereof substantially constant, and diluting the concentrated protein solution to an ionic strength below about 0.2 molar to cause formation of the dispersion.

In the latter process, the food grade salt solution preferably has an ionic strength of about 0.2 to about 0.8 molar and a pH of about 5.3 to about 6.2. In addition, the protein concentration step is preferably effected by a membrane technique at a volume reduction factor about 1.1 to about 6.0, as determined by the ratio of volume of protein solution and the volume of concentrated protein solution.

Further, the dilution of the concentrated protein solution is preferably effected by passing the concentrated protein solution into a body of water having a temperature below about 25° C. and a volume sufficient to decrease the ionic strength of the concentrated protein solution to a value of about 0.06 to about 0.12 molar.

In one embodiment of the latter process, the food grade salt solution has a pH of about 5 to about 5.5 and the phosphorus content of the protein solution is decreased prior to the dilution step.

The food grade salt used in the above-described solubilization procedures usually is sodium chloride, although other salts, such as potassium chloride or calcium chloride may be used.

As is set forth in U.S. Pat. No. 4,296,026, the purity of isolate which is obtained from soybeans may be improved by the presence of millimolar amounts of calcium chloride in the aqueous sodium chloride solution. As described therein, the protein is solubilized by contact with an aqueous sodium chloride solution having an ionic strength of at least about 0.2 molar and containing about 0.001 to about 0.01 M calcium chloride and having a temperature of about 15° to about 75° C.

Further, as is set forth in U.S. Pat. No. 4,307,014, the yield of isolate which is obtained from soybeans may be improved by effecting the protein solubilization at a temperature of about 15° to about 75° C. using an aqueus food grade salt solution of ionic strength of at least 0.2 M and a pH of about 5.6 to about 7.0, preferably about 6.0 to about 6.4, and then adjusting the pH of the protein solution to a pH of about 4.8 to about 5.4, preferably about 5.1 to about 5.3, prior to dilution of the pH-adjusted protein solution.

In accordance with this invention, the heat gelation properties of dispersions of the protein isolate in water are improved by incorporating in such dispersions sufficient at least one food grade salt to provide an ionic strength of the dispersion of at least about 0.2 molar and sufficient at least one food grade acidifying agent to provide a pH of the dispersion of less than about 6.0. The present invention, in effect, is a post-manipulation of the product of U.S. Pat. No. 4,285,862, formed by the processes of U.S. Pat. Nos. 4,169,090 and 4,208,323, as improved upon for soybeans in accordance with the processes of U.S. Pat. Nos. 4,296,026 and 4,307,014, by the simultaneous actions of food grade salt and food grade acid to impart heat gelation properties to the isolate which are comparable to or exceed those of egg white, which properties are not possessed by the isolate itself.

The ionic strength of the protein dispersion provided by the added at least one food grade salt usually varies from the lower limit of about 0.2 molar up to about 1.5 molar and preferably is in the range of about 0.3 to about 0.75 molar for the reasons discussed in detail below. While such ionic strength values represent a relatively high salt concentration in terms of the heat gellable dispersion, the overall salt concentration in a food composition incorporating the heat gellable dispersion will inevitably be very much lower and invariably within tolerable levels.

The pH of the protein dispersions provided by the addition of food grade acidifying agents may vary from the upper limit of about 6.0 down to about 3.5 and preferably is in the range of about 4.5 to about 5.5 for the reasons discussed in detail below.

The incorporation of the food grade salt and food grade acidifying agent into the protein dispersion may be effected in a number of ways. One manner of incorporation is to dissolve the food grade salt and food grade acidifying agent directly in an aqueous dispersion of the vegetable protein isolate.

Alternatively, the food grade salt and food grade acidifying agent, in the required proportions, may be uniformly mixed with the settled protein mass from the isolation procedure after separation from the residual aqueous phase, the mixture thereupon dried and the protein dispersion formed from the dried mixture. Such a dried mixture also may be formed by dry mixing the food grade salt, food grade acidifying agent and dried isolate.

The relative proportions of protein, food grade salt and food grade acidifying agent in such intermixed dry compositions depends on a number of factors, including the intended protein concentration in the aqueous heat gellable dispersion to be formed therefrom, the form of the acidifying agent and the source of the food grade salt.

For example, the food grade acidifying agent may be such as to provide part of the food grade salt. Also, the overall food grade salt concentration may be intended to be provided in part of the food system with which the protein dispersion is to be used.

In general, for each 100 parts by weight of dry vegetable protein isolate, there may be mixed therewith about 0.5 to about 4.0 parts by weight of food grade acidifying agent and up to about 2.5 parts by weight of food grade salt. Such a composition is capable of dispersion in water to form a dispersion of protein concentration of about 10 to about 30% w/w wherein the isolate is dispersed in an aqueous phase having an ionic strength of at least about 0.2 molar and a pH of up to about 6.0.

The food grade salt used in this invention to provide the required ionic strength usually is sodium chloride, although other food grade salts, such as, potassium chloride or calcium chloride may be used.

The food grade acidifying agent used in this invention to provide the required pH value may be any desired food grade acid, usually hydrochloric acid, but also including phosphoric acid, citric acid, malic acid and tartaric acid. The food grade acidifying agent may be of such a nature that it provides part of the ionic strength in the dispersion, for example, sodium tartrate or sodium citrate.

It has been found that an increase in the ionic strength of the dispersion of the protein above about 0.2 molar leads to an increased hardness of heat set gel formed from the dispersion up to a maximum at a given pH up to about 6.0, before once again decreasing.

Further, as the pH is decreased, an increased gel hardness is observed for the same ionic strength value above about 0.2 molar to a peak beyond which further decreases in pH value lead to decreases in gel strength. As the ionic strength of the dispersion increases, the peak gel hardness occurs at a lower pH value.

There is a broad spectrum of ionic strength and pH values over which the gel strength does not significantly change and the gel strength value usually is at least about 35 T.U. and preferably at least about 40 T.U. and hence at least as good as egg white gels (35 to 40 T.U.) produced from the same 20% w/w dispersions thereof.

For example, for soy PMM gels with no added sodium chloride in the pH range of 4.5 to 7.5, the gels were generally soft, exhibiting hardness values of 4 to 8 T.U. with the hardest gel (21 T.U.) being produced at pH 6.5 (from 20% w/w dispersions thereof). These values compare with hardness values for egg white gels (35 to 40 T.U.) formed at the same dispersion concentration.

As the concentration of added sodium chloride increased, the magnitude of the gel hardness values obtained increased, reaching a maximum value (from a 20% w/w dispersion) in excess of egg white of 48 T.U. at pH 5.0 and 0.5 M NaCl. Increased concentrations of sodium chloride in the range of 0.75 to 1.0 M over the pH range caused a slight decrease in gel hardness from this maximum. A broad region of high gel hardness was observed at sodium chloride levels above 0.3 M and gels with hardness values above 40 T.U. from 20% w/w dispersions thereof were obtained in the pH range of 4.5 to 5.5. With increasing sodium chloride concentration, the pH at which maximum gel hardness occurs decreased from pH 6.5 at 0 M NaCl to pH 5.0 at 0.5 M NaCl and pH 4.5 at 1.0 M NaCl.

The presence of the added salt substantially increases the dispersibility of the proteins. At low ionic strength values, from 0 to 0.1 M, dispersibility is low, ranging from 10 to 30% and gels produced under these conditions are extremely soft. At 0.2 M NaCl and above, dispersibility increases markedly to greater than 70% and is relatively insensitive to NaCl concentration and changes in pH. The gel hardness of the heat set gels, however, is independent of the dispersibility above about 30% and both hard and soft gels may be attained under conditions where the protein dispersibility exceeds 70%.

The presence of the food grade salt affects the end properties of the gel which is formed by heat gelation of the dispersion. Gels of similar hardness value can be quite different in visual appearance. The "sliceability" of the gels, an important factor in product application, may be determined by the Warner-Bratzler method as described in detail in an article entitled "Modification of Texture Instruments" by P. W. Voisey, J. of Texture Studies, 2 (1971), p.129 to 195. As the ionic strength of the dispersion increases, the sliceability of the gel, as determined by the Warner-Bratzler method, increases before again dropping off rapidly.

For example, it was found that the sliceability of a soy PMM gel was relatively independent of pH but quite sensitive to changes in sodium chloride concentration.

The highest values were attained in the region of 0.3 to 0.5 M NaCl and the values decreased rapidly for higher and lower NaCl levels. For gels produced at the same dispersion concentration, the sliceability values for the PMM gels were observed to be inferior to those for egg white gels but substantially superior to those for gels from other conventional vegetable protein isolates.

The manipulation of the protein dispersions formed from the protein isolate by the addition of sodium chloride and PH adjustment enables heat-set gels to be formed which have hardness values which are as good as or exceed those of egg white produced at the same protein dispersion concentration. This result enables the dispersions or dry mixes of the isolate, food grade salt and food grade acidifying agent to be used in various food systems as a substitute or extender for egg white, where the same is used for its gelation properties more efficiently than the unmodified isolate.

The food system in which the compositions of this invention find particular utility include various meat analogs, including bacon analogs, such as that described in U.S. Pat. No. 3,840,677 assigned to General Foods Corporation. The broad spectrum of pH and salt concentration values over which the high gel hardness values are attained permits flexibility from a processing standpoint.

Egg white is multifunctional over a wide range of conditions and often is used in meat analogs for both gelation and emulsification properties. The PMM isolate, however, exhibits functionality which is much more sensitive to environmental conditions, so that the conditions which favour optimum gelation properties, as set forth herein, may not necessarily be those conditions which favour emulsification, so that the composition of this invention often cannot be substituted directly into a formulation which has been optimized for egg white multifunctionality.

The protein source material from which the protein isolate is formed may be any convenient salt-extractable vegetable protein source, usually an oil seed, preferably soybeans, or a legume, preferably fababeans and field peas. The responses of the isolates from differing protein sources are similar and any differences in gelation behaviour result from differences in specific characteristics, such as, amino acid composition, between the protein sources.

EXAMPLES

Example 1

This Example illustrates the effect of ionic strength and pH on the gelation properties of soy PMM dispersions.

A protein isolate was formed from soybeans following the procedure of U.S. Pat. No. 4,208,323. 34.1 kg of soybean concentrate (about 50 wt.% protein) was mixed with 50 Imperial gallons of 0.35 molar sodium chloride solution at a 15% w/v concentration at a temperature of about 25° C. The mixture was stirred for about 30 minutes at a pH of about 6.3. The aqueous protein extract was separated from residual solid matter.

The extract was concentrated on an ultrafiltration unit using a "ROMICON" (Trademark) type XM50 and a Romicon type PM50 cartridge for a time sufficient to achieve a volume reduction factor of four times. The Romicon ultrafiltration cartridges are manufactured by Rohm and Haas Company, the designation "50" referring to a molecular weight cut-off of 50,000 Daltons.

The concentrate was diluted into cold water having a temperature of 7° C. to an ionic strength of 0.1 molar whereupon a white cloud of protein isolate formed in the dilution system. The protein dispersion was allowed to settle as highly viscous amorphous gelatinous precipitate (PMM) in the bottom of the dilution vessel.

4.2 kg of wet PMM containing 72.7 wt.% moisture were separated from the residual aqueous phase and were freeze dried to 1.275 kg of protein isolate. The protein isolate was found to be substantially undenatured (as determined by differential scanning calorimetry) and to contain 95.5 wt.% protein (as determined by Kjeldahl nitrogen $\times 6.25$).

Samples of the dry isolate prepared by the above-described procedure were formed into 20% w/w aqueous dispersions. The ionic strength of such dispersions was adjusted to varying values from 0 M to 1 M using sodium chloride and the pH of the dispersions also was adjusted to varying values from 4.5 to 7.5 by the addition of 6 N HCl or 6 N NaOH for major variations and 0.1 N HCl or 0.1 N NaOH for minor adjustments. Samples were dispersed for 30 minutes at ambient temperature (20° to 25° C.).

The protein dispersions were poured into stainless steel gel tubes (2½ in. × ¾ in. I.D.) with removable stainless steel caps after greasing to facilitate removal of the gel. The gel tubes were heated in a boiling water bath for 45 minutes and then cooled to 20° C. for a minimum of 20 minutes. The gels were removed from the tubes immediately before testing, to minimize water loss from the surface.

Each gel was sliced into three ¾-inch length cylinders and tested for hardness on the G.F. Texturometer using a 2-inch diameter disc plunger. Each sample was compressed twice and the peak heights measured. The hardness was calculated according to the method of Freidman et al (mentioned above) from the formula:

$$\text{Hardness (T.U.)} = \frac{\text{Height of First Peak} \times \frac{\text{millivolts}}{2}}{\text{Voltage}}$$

The hardness values obtained for the various gels were plotted graphically against the pH and NaCl concentration. The results are reproduced in FIG. 1.

As can be seen from FIG. 1, the gel hardness rapidly increased for ionic strength values above 0.3 for pH values of about 4.5 to about 5.5. As the ionic strength increases, the pH at which maximum gel hardness was attained shifts downward, reaching a maximum of 48 T.U. at pH 5.0 and 0.5 M NaCl. Further increases in NaCl concentration were accompanied by a downward shift in the optimum pH, except that gel hardness values began to decrease slightly.

The result of the pH shifts and increases in gel hardness values was a broad area of high hardness in excess of 35 T.U. occurring in the pH range of 4.5 to 5.5 and the ionic strength range of 0.3 to 0.75 M NaCl.

In contrast, gels formed from egg white under various salt concentrations and pH values exhibited relative insensitivity to pH and salt concentration variations, with gel hardness values in the range of 35 to 40 T.U. being observed.

Example 2

This example illustrates the formation of gels from various proteinaceous materials.

Gel samples were prepared from various protein sources and the hardness of the gels was measured using the procedure recited in Example 1. A first set of gel samples was prepared from 20% w/w protein dispersions of soy PMM prepared as set forth in Example 1 having varying pH and salt concentration values, resulting from the addition of appropriate concentrations of chemicals. The hardness values were compared with that for a gel obtained from a 20% w/w dispersion of egg white at its as is pH (7.5).

The results are set forth in the following Table I:

TABLE I

| Material | Conditions | Hardness values (T.U.) |
|---|---|---|
| Soy PMM | As is[1] | 4 |
| Soy PMM | pH 5.0 0.1 M NaCl[2] | 5 to 8 |
| Soy PMM | pH 7.0 0.1 M NaCl[2] | 20 |
| Soy PMM | pH 7.0 0.5 M NaCl[2] | 14 |
| Soy PMM | pH 5.0 0.5 M NaCl[3] | 48 |
| Soy PMM | pH 4.5 1.0 M NaCl[3] | 38 |
| Egg White | As is (pH 7.5 0 M NaCl) | 35 to 40 |

Notes:
[1]This is the dried product produced in Example 1 at pH 6.3 and 0.1 M NaCl
[2]These values are outside the scope of the invention
[3]These values are within the scope of the invention As will be seen from the results of Table I, soy PMM as is and soy PMM with adjusted acidity produce gels of low hardness values. When both the pH and salt concentration of the dispersions are simultaneously adjusted to a pH of 5.0 or 4.5 and a salt concentration of 0.5 or 1.0 M, i.e. within the ranges of acidity of 3.5 to 6.0 and ionic strength of 0.2 to 1.5 molar, then the gels produced are considerably harder than those produced outside the recited ranges and are at least comparable to the hardness for gels produced from egg white at the same concentration.

(b) A second set of gel samples was prepared from dispersion of other soy isolates namely Promine D (from Central Soy) and U4-102 (from Staley). U4-102 is an experimental isolate which the inventors believe to be produced according to the procedure of Howard et al U.S. Pat. No. 4,234,620. It was first attempted to provide the dispersions at 20% w/w concentration. However, a lower concentration of 15% w/w had to be used since the U4-102 would not disperse at 20% and Promine D presented considerable viscosity difficulties in a 20% dispersion. For comparison purposes, gels were also produced from soy PMM at 15% w/w.

The results are set forth in the following Table II:

TABLE II

| Material | Conditions | Hardness T.U. |
|---|---|---|
| Promine D | pH 5.0 0.5 M NaCl | 3 |
|  | pH 7.0 0.1 M NaCl | 9 |
| U4-102 | pH 5.0 0.5 M NaCl | 10 |
|  | pH 7.0 0.1 M NaCl | 12 |
| Soy PMM | pH 5.0 0.5 M NaCl[1] | 25 |
|  | pH 7.0 0.1 M NaCl[2] | 15 |

Notes
[1]These pH and concentration values are within the scope of the invention
[2]These pH and concentration values are outside the scope of the invention As can be seen from the results of the above Table II, in comparison with those in Table I, the soy PMM gels exhibited considerably greater hardness with lower pH while, for Promine D and U4-102, the reverse was true. In all instances, the PMM gels had a greater hardness than the other isolates, when formed from dispersions of the same protein concentration.

Example 3

This Example illustrates the variation of gel hardness with concentration of dispersion of soy PMM and egg white.

Gels were prepared from dispersions of soy PMM and egg white at varying concentrations of protein. For each soy PMM gel, soy PMM produced by the procedure of Example 1 was used and the dispersions were adjusted in pH to a pH of 5.0 and in ionic strength to 0.5 M NaCl. For each egg white gel, the egg white was used at its as is pH (7.5) and salt concentration (0 M).

The results obtained are set forth in the following Table III:

TABLE III

| Concentration of Dispersion | Hardness (T.U.) | |
|---|---|---|
| % w/w | Soy PMM | Egg White |
| 10 | 4.0 | 3.0 |
| 15 | 25.0 |  |
| 20 | 48.0 | 38.0 |
| 23 | 62.0 |  |
| 27 | 68.0 | 66.5[1] |
| 30 | 91.0 | 79.0 |
| 33 | 101.0 |  |
| 40 | 118.0 | 118.0 |

Note:
[1]Gel was produced at 26% w/w concentration.

As can be seen from the results set forth in Table III, the hardness of the soy PMM gels was the same as or exceeded that of gels formed from the egg white at the same dispersion concentration for a wide range of dispersion concentrations.

EXAMPLE 4

This Example illustrates the comparison between gels produced from soy PMM in accordance with this invention and those produced from the closest known prior art, namely "Fraction W" of Davidson et al, U.S. Pat. No. 4,172,828.

Following the procedure set forth in Davidson et al, Fraction W was produced in the following manner. Soy fluff 200 W (1 part to 5 parts H₂O) was extracted for 50 minutes at 65° C. The dispersion was centrifuged for 5 minutes at 5000×g to remove undispersed solids. The whey fraction was cooled to 5° C. for 3 hours and then centrifuged at 5000×g for 10 minutes to remove the solids. (The solids are "Fraction 9C" referred to in the Davidson et al patent).

The whey was warmed to 38° C., adjusted to pH 5.3 and centrifuged at 5000×g for 10 minutes to remove the solids ("Fraction M"). The whey fraction was cooled to 16° C., adjusted to pH 4.5 and centrifuged for 10 minutes at 5000×g. The solids collected was Fraction W.

The Fraction W analyzed 66.8% H$_2$O (33.2% solids) and 84.48 wt.% protein (N×6.25). The protein content was less than the at least 90 wt.% protein normally required to be considered a protein "isolate" and hence Fraction W is a protein concentrate. The analyzed protein concentration contrasts markedly with the 95.5 wt.% protein of the soy PMM product obtained in Example 1.

The gelation properties of the Fraction W prepared in this manner were determined. A first gel was prepared from a 40% w/w dispersion of the Fraction W at an "as is" pH of 4.5 with no added NaCl and two additional gels were prepared from 20% w/w dispersions of the Fraction W which were adjusted for pH and salt concentration to values of pH 5.0, 0.5 M NaCl and pH 6.0, 0.2 M NaCl respectively.

It was observed with respect to the 20% w/w dispersions that settling tended to occur while in the case of the 40% w/w dispersion, no such tendency was observed. After gelation, it was found that the solids in both 20% w/w dispersions had settled. The hardness values were determined after removal of liquid and the actual solids concentration of the settled gels was determined.

The hardness values for the gels are set forth in the following Table IV along with comparative values for soy PMM and egg white taken from Table I in Example II above:

TABLE IV

| Gel Concentration (% w/w) | Conditions | Fraction W | Hardness (T.U.) Soy PMM | Egg White |
|---|---|---|---|---|
| 40 | As is | 73.0 | | 118.0 |
| 40 | pH 5.0 0.5 M NaCl | | 118.0 | |
| 26 | As is | | | 66.5 |
| 26 | pH 5.0 0.5 M NaCl | 38.0[1] | | |
| 25.7 | pH 6.0 0.2 M NaCl | 20.0[1] | | |
| 27 | pH 5.0 0.5 M NaCl | | 68.0 | |
| 20 | As is | | | 35 to 40 |
| 20 | pH 5.0 0.5 M NaCl | | 48 | |

Notes:
[1]The 26% w/w and 25.7% w/w values are the actual solids level of the gel prepared from nominally 20% w/w dispersions of Fraction W.

The results of Table IV demonstrate that, while under certain conditions (i.e. pH 5.0, 0.5 M NaCl), Fraction W may appear to provide a gel of hardness the same as that of egg white at the same solids concentration, the result is deceptive, in that the actual solids concentration of the gel is considerably higher than the nominal value, as a result of settling.

When the hardness values of these gels produced from Fraction W at its actual solids concentration are compared with egg white at the same solids concentration, it will be seen that the value obtained for egg white is considerably greater than that for Fraction W. The results of Table IV demonstrate that Fraction W is incapable of forming gels of hardness comparable to egg white when that comparison is effected at the same solids concentration in the gel.

EXAMPLE 5

This Example illustrates the effect of pH and NaCl on sliceability of the gels formed from soy PMM dispersions.

Soy PMM was prepared following the procedure of Example I and gels were formed from dispersions of the dry soy PMM at various pH values and sodium chloride concentrations as described in Example I. The sliceability of the gels was evaluated using a Warner-Bratzler (W.B.) apparatus (the details of which are described above).

The apparatus consisted of an electrically powered press and a force transducer to detect the force generated by deformation of the samples. The transducer signal was amplified and recorded on a Hewlett Packard Strip Chart Recorder (Model 7100B with a 200 series disc integrator). Three 0.04 inch blades were attached to the transducer and each has a triangular hole which circumscribe a circle one inch in diameter. The sample was placed through the holes of the three blades and pulled up through three 0.045 inch slots. A crosshead speed of 12 cm/sec was used, the apparatus was calibrated to read 2.5 kg full scale at 5% sensitivity and the millivolt input to the recorder was varied to keep the sample peaks on the scale. A recorder chart speed of 0.1 inches/min was used.

The areas of the peaks produced were measured using a mechanical integrator and reported in number of counts. The values attained were plotted graphically against pH and NaCl concentration and results are found in FIG. 2. The higher the area value, the greater is the sliceability of the gel.

Figure 2:
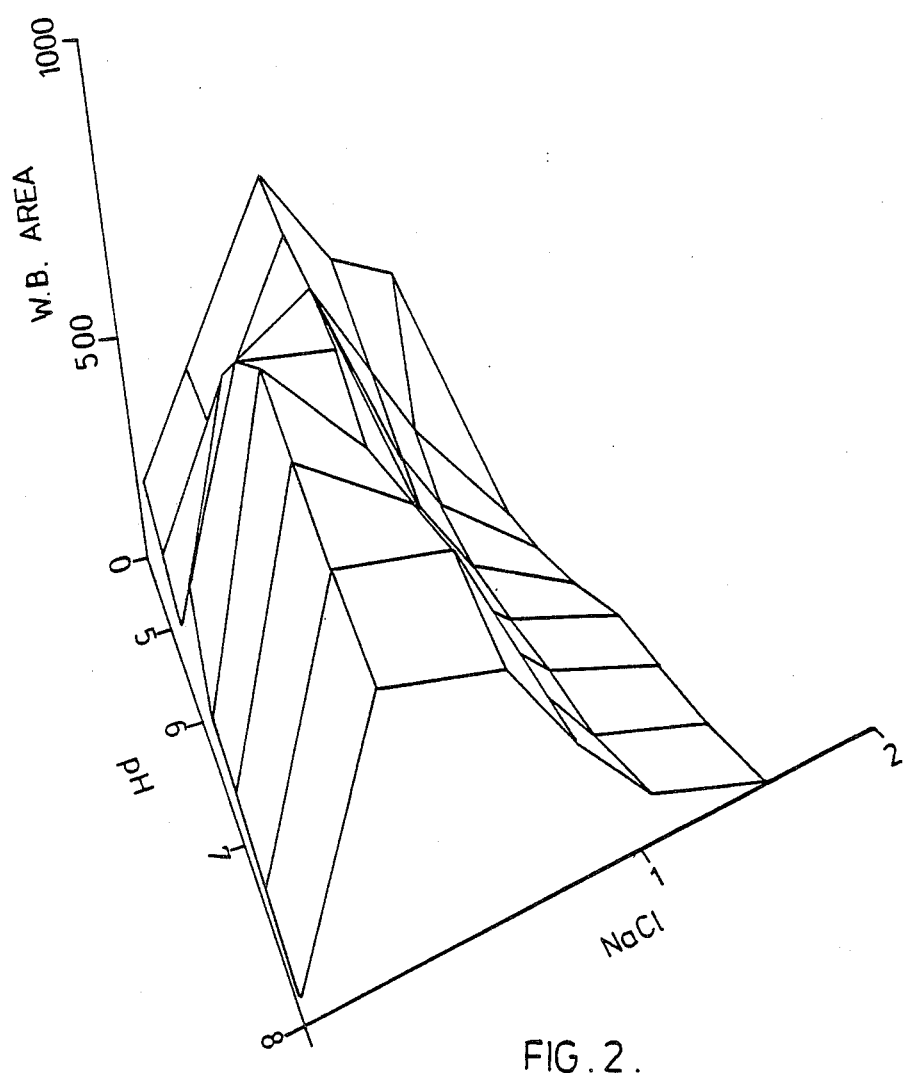
FIG. 2 is a graphical representation of the effects of pH and sodium chloride concentration on the texture of gels produced from the soy protein isolate.

As may be seen from FIG. 2, the W.B. area was found to be relatively independent of pH and most sensitive to changes in sodium chloride concentration, the areas being highest between 0.2 and 0.5 M NaCl and decreasing rapidly for higher and lower NaCl levels.

EXAMPLE 6

This Example illustrates the effect of pH and NaCl on protein dispersibility.

Soy PMM was prepared and dispersions were formed therefrom following the procedures of Example I. The dispersions which were used to form protein gels at various pH values and NaCl concentrations were centrifuged at $3000 \times g$ for 10 minutes. The supernatant was sampled and the amount of nitrogen was determined by Kjeldahl analysis. The percent dispersibility of the protein was expressed as a percentage of the total expected protein (20% w/w).

Figure 3:
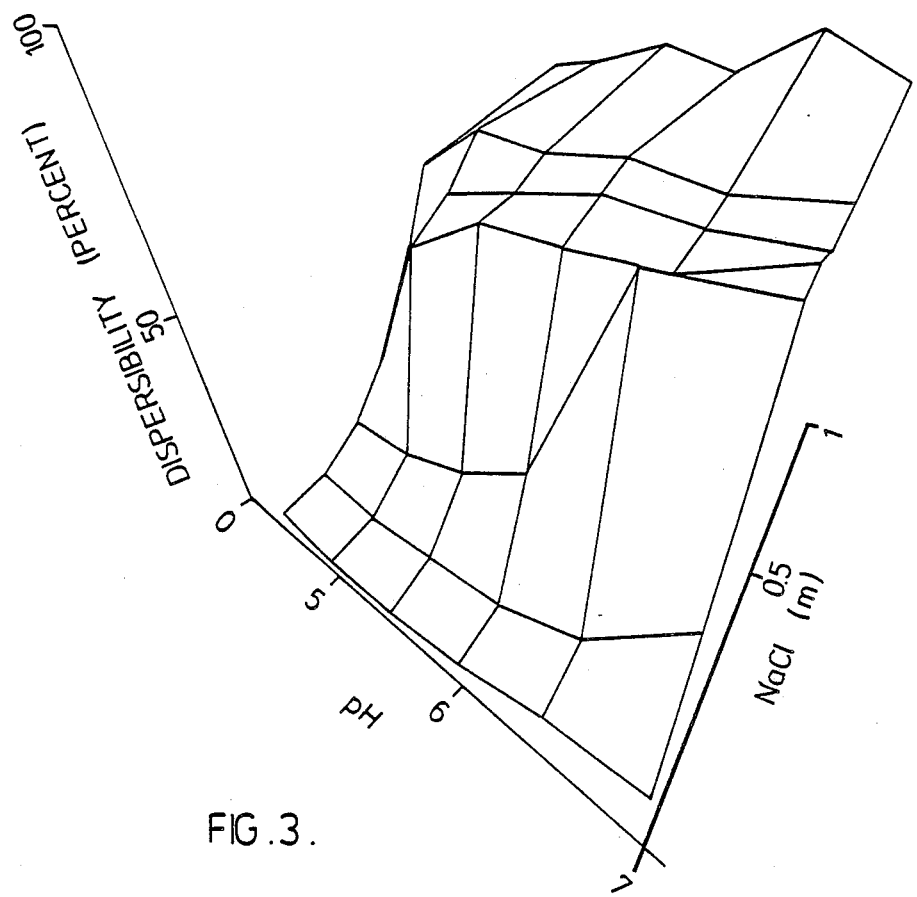
FIG. 3 is a graphical representation of the effects of pH and sodium chloride concentration on the dispersibility of the soy protein isolate.

The dispersibility results obtained were plotted graphically against pH and NaCl concentration and the results are found in FIG. 3. As is seen from FIG. 3, NaCl concentrations above 0.2 M result in consistently high protein dispersibility throughout the entire pH range.

EXAMPLE 7

This Example illustrates the application of pH and ionic strength adjustment to other protein source materials.

PMM isolates were prepared from fababean and field peas following generally the procedure of Example 1 and gels were prepared under varying pH and NaCl concentraation conditions in analogous manner to that described in Example I and the hardness values determined. Similar responses to pH and NaCl concentration to those for soy were observed.

For fababeans, gels of maximum hardness value were formed under conditions of high NaCl (0.5 to 1.0 M) and low pH (4.0 to 5.5). For field peas, the corresponding conditions were NaCl 0.5 to 1.0 M and pH 4.0 to 5.5. The conditions of maximum hardness varied among the protein sources and the hardest gels were observed with soy PMM.

EXAMPLE 8

This Example illustrates the use of the compositions of the invention as a replacement for part of the egg white in a bacon analog.

Following the procedure outlined in U.S. Pat. No. 3,840,677, the disclosure of which is incorporated herein by reference, the red and white phases of a bacon analog were prepared utilizing the components and quantities outlined in Tables I and II of the patent.

A series of replacement levels of soy PMM replacing egg white ("albumen") were tested for the white phase under varying pH and salt concentrations. The results are reproduced in the following Table V:

TABLE V

| % Total Egg White | Egg White Replaced | NaCl[1] pH | (M) | Hardness[2] (T.U.) | Cohesiveness (3) |
|---|---|---|---|---|---|
| 100 | — | 6.0 | 1.8 | 75 | 0.80 |
| 45 | 55 | 4.5 | 0.75 | 67 | 0.75 |
| 75 | 25 | 6.0 | 1.8 | 59 | 0.78 |
| 50 | 50 | 6.0 | 1.8 | 46 | 0.77 |

Notes:
[1] The sodium chloride concentration is on the basis of the aqueous phase and represents an overall sodium chloride concentration in the composition of about 1 to 2 wt. %.
[2] Hardness values measured are for the product and not for the heat set gel.
[3] The cohesiveness is determined by the texturometer as the ratio of the area of the second peak to the area of the first peak.

Replacement of 55% of the egg white at pH 4.5, 0.75 M NaCl (in the aqueous phase), produced a product of acceptable texture, whereas the other levels of replacement at higher pH and NaCl concentration lead to a significant and unsatisfactory decline in the texture.

For the red phase, 100% replacement of egg white by soy PMM did not produce an acceptable product, but when the soy PMM also was used to replace conventional soy isolates in the red phase, a product was obtained having a texture equivalent to that of the conventional product containing egg white and conventional soy isolate.

SUMMARY OF DISCLOSURE

In summary of this disclosure, the present invention provides a novel heat-gellable protein isolate which is formed by pH and ionic strength manipulations of dispersions of protein micellar masses and which forms gels of hardness comparable to or exceeding that of egg white from protein dispersions of the same concentration. Modifications are possible within the scope of the invention.

What we claim is:

1. A vegetable protein isolate containing at least about 90% by weight of vegetable protein (as determined by Kjeldahl nitrogen $\times$ 6.25) and capable of forming heat set gels from dispersions thereof, which gels have a hardness value which is at least that of a heat set gel formed from a dispersion of egg white in water having the same dispersion concentration.

2. The isolate of claim 1 wherein said hardness value is at least about 40 texturometer units when measured for a heat set gel formed from a dispersion of said isolate having a protein concentration of about 20% w/w.

3. The isolate of claim 1 or 2 wherein the vegetable protein is soybean.

4. A method of improving the heat gelation properties of a substantially undenatured vegetable protein isolate containing at least about 90% by weight of vegetable protein (as determined by Kjeldahl nitrogen $\times$ 6.25) to an extent such that heat set gels may be formed therefrom having a hardness value which is at least comparable to that of a heat set gel formed from a dispersion of egg white in water having the same dispersion concentration, which comprises:
 (a) treating at least one vegetable protein source material to form said vegetable protein isolate, and
 (b) subsequently treating said vegetable protein isolate both with at least one food grade salt and at least one food grade acidifying agent to incorporate in a heat gellable dispersion of said protein isolate sufficient food grade salt to provide an ionic strength of said dispersion of from about 0.3 to about 0.75 molar and sufficient food grade acidifying agent to provide a pH of said dispersion of from about 4.5 to about 5.5.

5. The method of claim 4, wherein said food grade salt is sodium chloride.

6. The method of claim 4, wherein said food grade acidifying agent is selected from the group consisting of hydrochloric acid, phosphoric acid, citric acid, malic acid or tartaric acid.

7. The method of claim 4 wherein said food grade salt is sodium chloride and said food grade acid is hydrochloric acid.

8. A method of improving the heat gelation properties of a substantially undenatured vegetable protein isolate containing at least about 90% by weight of vegetable protein (as determined by Kjeldahl nitrogen $\times$ 6.25) to an extent such that heat set gels may be formed therefrom having a hardness value which is at least comparable to that of a heat set gel formed from a dispersion of egg white in water having the same dispersion concentration, which comprises:
 (a) settling an aqueous dispersion of protein micelles consisting of amphiphilic protein moieties and formed from at least one vegetable protein source material to provide an amorphous protein mass containing said substantially undenatured protein isolate, said isolate having substantially no lipid content, substantially no lysinoalanine content and substantially the same lysine content as the storage protein in the source material, and
 (b) incorporating in a heat gellable dispersion of said protein isolate both (i) sufficient food grade salt to provide an ionic strength of from about 0.3 to about 0.75 molar and (ii) sufficient food grade acidifying agent to provide a pH of said dispersion of from about 4.5 to about 5.5.

9. The method of claim 8 wherein said aqueous dispersion of protein micelles from which said isolate is settled is formed by solubilizing the protein in said at least one vegetable protein source material using a food grade salt solution having a concentration of at least 0.2 molar ionic strength and a pH of 5.5 to 6.3 to form a protein solution, and diluting the protein solution to an ionic strength of less than 0.1 molar to cause formation of said dispersion.

10. The method of claim 8 wherein said aqueous dispersion of protein micelles from which said isolate is settled is formed by solubilizing the protein in said at least one vegetable protein source material using a food grade salt solution having a concentration of at least 0.2 molar ionic strength and a pH of about 5 to about 6.8 to form a protein solution, increasing the protein concentration of said protein solution while maintaining the ionic strength thereof substantially constant, and diluting the concentrated protein solution to an ionic strength below about 0.2 molar to cause formation of said dispersion.

11. The method of claim 10 wherein said food grade salt solution has an ionic strength of about 0.2 to about 0.8 molar, a pH of about 5.3 to about 6.2, said protein concentration step is effected by a membrane technique at a volume reduction factor of about 1.1 to about 6.0, as determined by the ratio of volume of protein solution and the volume of concentrated protein solution, and the dilution of the concentrated protein solution is effected by passing the concentrated protein solution into a body of water having a temperature below about 25° C. and a volume sufficient to decrease the ionic strength of the concentrated solution to a value of about 0.06 to about 0.12 molar.

12. The method of claim 9, 10 or 11, wherein said protein source material is soybeans, said food grade salt is sodium chloride and said aqueous food grade salt solution contains about 0.001 to about 0.01 M of calcium chloride.

13. The method of claim 9 wherein said dispersion of protein micelles from which said isolate is settled is formed by solubilizing the protein in soybeans at a temperature of about 15° C. to about 75° C. using a food grade salt solution having a concentration of at least 0.2 molar ionic strength and a pH of about 5.6 to about 7.0 to form a protein solution, adjusting the pH of the protein solution to a pH of about 4.8 to about 5.4, and diluting the pH-adjusted solution to an ionic strength value sufficiently low to cause formation of said dispersion.

14. The method of claim 13 wherein said solubilization pH is about 6.0 to about 6.4 and said adjusted pH is about 5.1 to about 5.3.

15. The method of claim 9, 10, 11, 13 or 14 wherein said food grade salt and said food grade acidifying agent are incorporated into said dispersion by drying said settled solid phase after separation from the remaining aqueous phase, uniformly mixing said food grade salt and said food grade acidifying agent with the resulting dried isolate, and forming said dispersion from the resulting mixture.

16. The method of claim 9, 10, 11, 13 or 14 wherein said food grade salt and food grade acidifying agent are incorporated into said dispersion by uniformly mixing said food grade salt and said food grade acidifying agent with said settled solid phase after separation from the remaining aqueous phase, drying the uniform mixture so produced, and forming said dispersion from said dried mixture.

17. The method of claim 9, 10, 11, 13 or 14 wherein said food grade salt and said food grade acidifying agent are incorporated into said dispersion by dissolving said food grade salt and said food grade acidifying agent in an aqueous dispersion of said solid phase.

18. An aqueous dispersion suitable for heat gelation to a gel having a hardness value which is at least comparable to that of a heat set gel formed from a dispersion of egg white in water having the same dispersion concentration, which comprises a substantially undenatured vegetable protein isolate containing at least about 90% by weight of vegetable protein (as determined by Kjeldahl nitrogen $\times$ 6.25) in the form of an amorphous protein mass which is formed by settling an aqueous dispersion of protein micelles consisting of homogeneous amphiphilic protein moieties and formed from at least one vegetable protein source material, said protein mass having substantially no lipid content, substantially no lysinoalanine content and substantially the same lysine content as the storage protein in the source material said isolate being dispersed in an aqueous phase having an ionic strength of about 0.3 to about 0.75 molar and a pH of about 4.5 to about 5.5.

19. The dispersion of claim 18 wherein said vegetable protein source material is selected from the group consisting of soybeans, fababeans and field peas.

20. The dispersion of claim 18 wherein said isolate is present in said dispersion in a concentration of about 10 to about 30% w/w.

21. The dispersion of claim 18 wherein said food grade salt is sodium chloride and said food grade acid is hydrochloric acid.

* * * * *